United States Patent [19]
Adlerfligel et al.

[11] Patent Number: 6,151,156
[45] Date of Patent: Nov. 21, 2000

[54] OPTICAL FIBRE AMPLIFIER AND TRANSMISSION SYSTEM WITH OPTICAL FIBRE-AMPLIFIER

[75] Inventors: Manuel Adlerfligel, Paris; Jean-François Panafieu, Draveil, both of France

[73] Assignee: Alcatel, Paris, France

[21] Appl. No.: 09/452,838

[22] Filed: Dec. 2, 1999

[30] Foreign Application Priority Data

Dec. 11, 1998 [EP] European Pat. Off. .............. 98440291

[51] Int. Cl.[7] ................ H04B 10/17; H01S 3/06
[52] U.S. Cl. ............... 359/337; 359/134; 359/341; 385/37; 372/6; 372/102
[58] Field of Search .................. 359/130, 134, 359/179, 337, 341; 385/37; 372/6, 33, 34, 102

[56] References Cited

U.S. PATENT DOCUMENTS

| | | | |
|---|---|---|---|
| 5,042,898 | 8/1991 | Morey et al. .................. | 385/37 |
| 5,177,562 | 1/1993 | Wysocki et al. . | |
| 5,541,766 | 7/1996 | Mizrahi et al. .................. | 359/337 |
| 5,694,503 | 12/1997 | Fleming et al. .................. | 385/37 |
| 5,703,978 | 12/1997 | DiGiovanni et al. .................. | 359/341 |
| 5,914,972 | 6/1999 | Elola et al. .................. | 372/33 |
| 5,943,152 | 8/1999 | Mizrahi et al. .................. | 359/187 |
| 5,987,200 | 11/1999 | Fleming et al. .................. | 359/130 |

FOREIGN PATENT DOCUMENTS

| | | |
|---|---|---|
| 0 629 057 A1 | 12/1994 | European Pat. Off. . |
| 0 769 861 A2 | 4/1997 | European Pat. Off. . |
| 0 848 464 A2 | 6/1998 | European Pat. Off. . |

OTHER PUBLICATIONS

Lee et al, OFC '98, Tech. Digest, vol. 21 pp. 133–134, Feb. 27, 1998.

Lee, J. H. et al: "Reduction of Temperature–Dependent Multichannel Gain Distortion Using a Hybrid Erbium–Doped Fiber Cascade" IEEE Photonics Technology Letters, vol. 10, No. 8, Aug. 1998, pp. 1168–1170, XP000769891.

*Primary Examiner*—Nelson Moskowitz
*Attorney, Agent, or Firm*—Sughrue, Mion, Zinn, Macpeak & Seas, PLLC

[57] ABSTRACT

An optical fibre-amplifier and a transmission system with such a fibre-amplifier is proposed, in which the fibre-amplifier has an amplifying fibre-component with optical fibre-amplifier (2) and at least one optical component (6) which possesses a temperature behavior, which compensates the effects on the optical behavior of the fibre-amplifier.

9 Claims, 2 Drawing Sheets

OPTICAL FIBRE AMPLIFIER AND TRANSMISSION SYSTEM WITH OPTICAL FIBRE-AMPLIFIER

BACKGROUND OF THE INVENTION

The invention comprises an optical fibre-amplifier and a transmission system with optical fibre-amplifier in accordance with the nature of the independent claims.

From the literature, a multiplicity of optical fibre-amplifiers is known. Optical fibre-amplifiers consist of a special fibre, the core of which is doped with a rare-earth element. By pumping the rare-earth ions with a suitable pump wavelength, an inversion condition, which can be called by an incoming optical signal is generated in the fibre. The amplification profile of such a fibre-amplifier exhibits a maximum, where the maximum depends on the type, the quantity of the rare-earth element and a co-doping. The aim in using optical transmission systems is to get as wide and flat an amplification curve as possible. Specifically in wavelength division multiplex (WDM) a flat and adequately wide amplification profile of the fibre-amplifier is desired. The temperature behavior of a fibre amplifier, however, causes problems. The problem is, that the spectral transmission of the passive components of a fibre amplifier and the spectral behavior, specifically the amplification profile of the active fibre, change with temperature. This variable temperature behavior has an unfavorable effect on the amplification profile, particularly on the desired flat amplification curve of the fibre-amplifier.

From U.S. Pat. No. 5,177,562 a method is known for influencing the temperature behavior, which has an unfavorable effect on the amplification profile of the fibre amplifier. It is proposed to optimize the pump performance of the pump laser as well as the pump wavelengths to exert an influence on the amplification profile in a suitable manner, in order to compensate for the temperature effects. The proposed method effects a temperature compensation for the behavior of the amplifying fibre, but does not take the temperature-behavior of other components in an optical fibre-amplifier into account.

SUMMARY OF THE INVENTION

In contrast, the fibre-amplifier in accordance with the invention with the characterising features of the independent claim has the advantage that the optical behavior of the complete fibre-amplifier is optimised, in that the temperature-behavior of the amplifying doped fibre is compensated by the temperature behavior of other optical components. The compensation of the temperature dependent optical qualities of the different components by the selection of suitable materials or suitable components is a purely optical solution, which is brought about without electronic control and supervision. It is possible in this way, to achieve great stability over a wide temperature range without having available complex monitoring devices and measuring methods. Because of the purely optical solution the fibre amplifier is very temperature stable and its installation in a transmission system optimizes the temperature-behavior of this system.

Through the measures presented in the sub-claims an advantageous extension and improvement of the optical fibre amplifier described in the independent claim is possible.

It is possible to employ any combination of optical components (with, if wanted, different temperature behaviors. It is of advantage, if the optical component comprises a filter. Bragg filters, the temperature behavior of which can be very well defined, are especially advantageous.

Furthermore, the use of suitable couplers, which are incorporated in the optical fibre amplifier, is necessary in order to couple signal-light and pumping light in the amplifying fibre. A temperature compensation is also possible by suitable selection of the temperature behavior of the coupler.

Furthermore, it is especially advantageous to use an optical component in an optical fibre-amplifier, which consists of another doped fibre-component. This fibre component can advantageously be a fibre-component spliced into the signal-branch of the fibre amplifier. With special doping materials, the temperature-behavior can be influenced in the desired manner. This doped fibre component may also advantageously be the next amplifier stage in a cascaded multi-stage amplifier.

An example of an embodiment of the invention is shown in the drawing and is explained in more detail in the following description.

BRIEF DESCRIPTION OF THE DRAWINGS

In the Figures

DETAILED DESCRIPTION OF THE INVENTION

Figure 1:
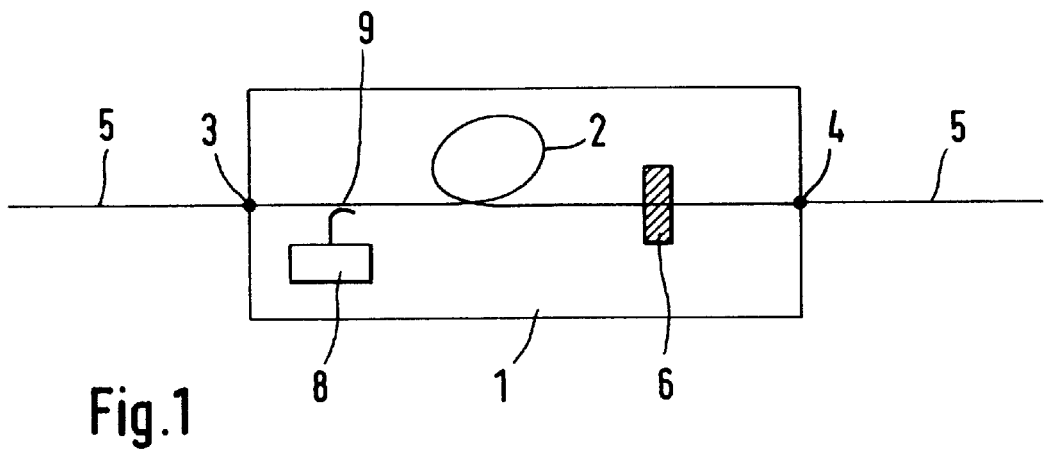
FIG. 1 shows the schematic construction of an optical fibre amplifier.

The optical fibre-amplifier 1 has an optical input 3 and an optical output 4. The inputs and outputs are in each case connected to an optical transmission section 5. The optical fibre-amplifier comprises a pumping light source 8 which is connected via a coupler 9 with the amplifying fibre component 2. The amplifying fibre component 2 on the other hand has a connection to an optical component 6. The signal to be transmitted is fed into the fibre-amplifier via the optical input 3. This is a simple and exemplary embodiment to describe that the term "optical fibre amplifier" means a complete device with all optical and electronic components.

In the direction of propagation of the signal, the pumping light from the pumping light source 8 is also fed in via the coupler 9. The optical signal is amplified within the amplifying fibre 2. In this example the output of the amplifying fibre 2 is at the input of the optical component 6. The optical component may be a filter or another passive component or even an active component. The amplified optical signal is fed into the transmission line 5 via the optical output 4.

Figure 2:
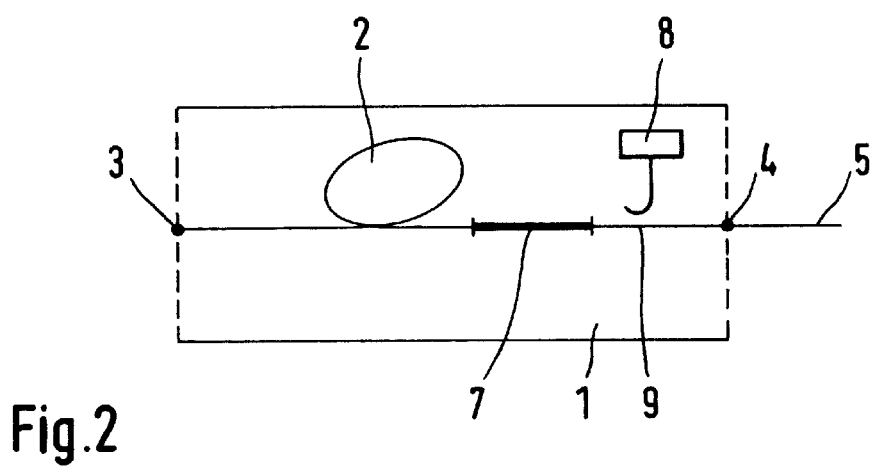
FIG. 2 shows an alternative amplifier construction in accordance with the present invention.

FIG. 2 shows another embodiment of the optical fibre-amplifier in accordance with the invention. In this example, the amplifying fibre 2 is connected with a fibre-component 7. This fibre-component 7 may exhibit special doping, the temperature behavior of which is opposite to that of the amplifying fibre component 2.

Figure 3:
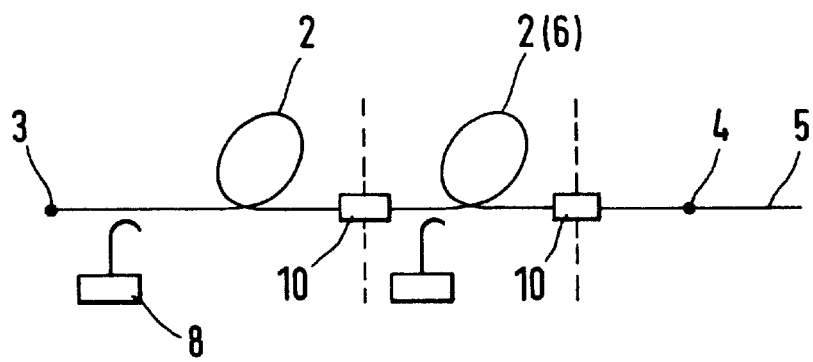
FIG. 3 shows a multi-stage amplifier.

In the embodiment in accordance with FIG. 3, a multi-stage fibre-amplifier is represented. The output of the first amplifier stage is connected with the input of the next amplifier stage. An especially advantageous solution is to select the amplifying fibres 2 in such a way, that the temperature behavior of the two fibre components is opposite. As shown in FIG. 3, the optical component is realized in such a case by a fibre-component 2.

Figure 4:
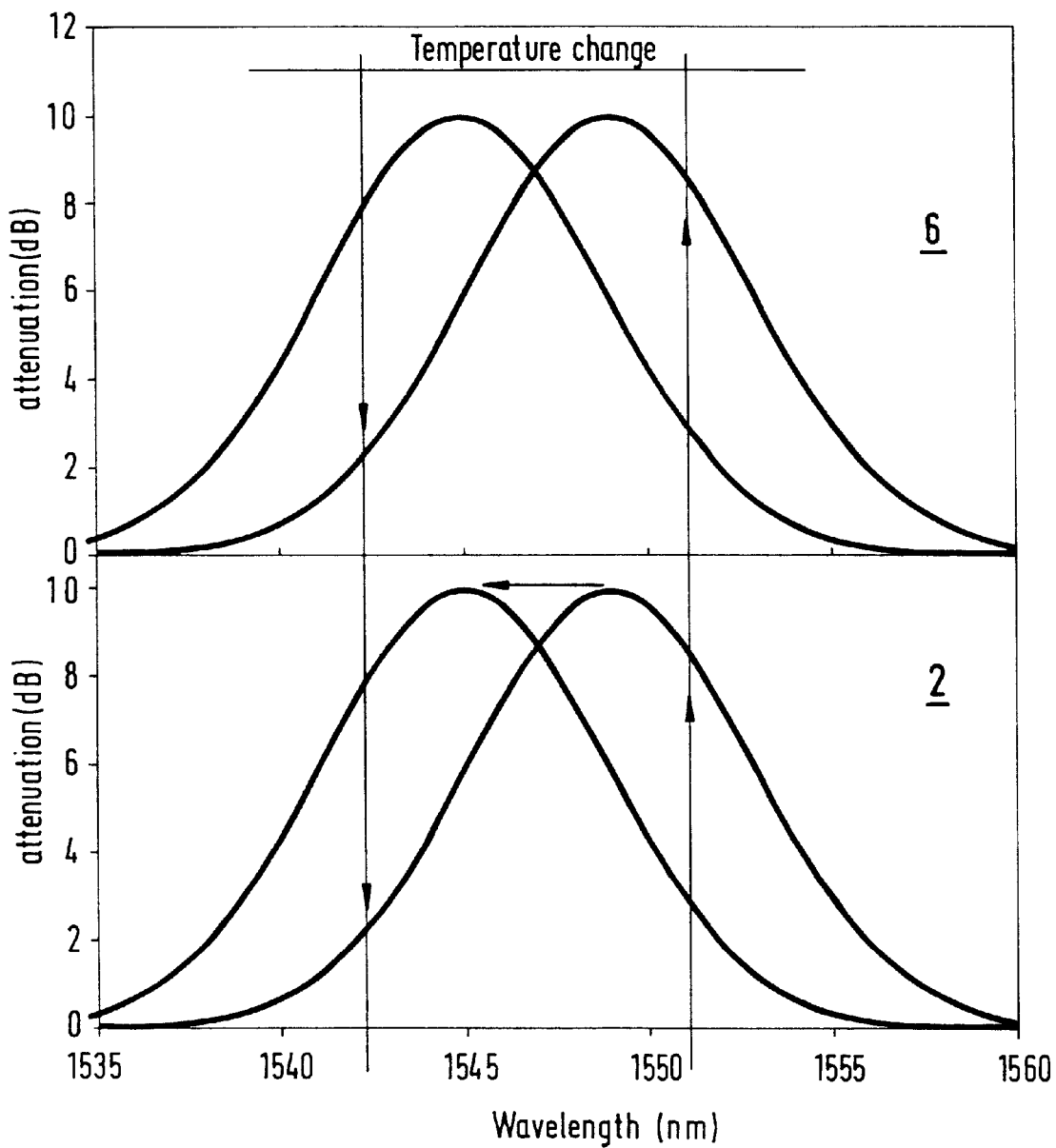
FIG. 4 shows schematically the temperature compensation of an optical component suitable for use in the invention.

FIG. 4 shows an example of optical component whose behavior permits, in some cases, to achieve a good stability of the amplifier in a varying temperature. An optical filter is used here: the diagram shows the spectral attenuation and its behavior in temperature The upper part of the illustration shows the shift of the maximum of the wavelength with temperature for the optical component 6. The maximum shifts itself here in direction of longer wavelengths. In the lower part of the FIG. 2 the temperature behavior of a amplifying fibre 2 is shown schematically. Here, the maximum of the wavelengths is shifted to shorter wavelengths. An especially advantageous embodiment for the stabilisation of the optical fibre amplifier is a form, which envisages the use of optical Bragg gratings. These optical Bragg gratings can be represented not only as a filter, such as applied on a glass-substrate, but also in the form of a fibre Bragg grating. The temperature-behavior of Bragg gratings and the possibility of holding a Bragg grating stable by suitable means even over a temperature range is known from the literature, for example from U.S. Pat. No. 5,042,898. Both the temperature behavior and the transmission curve of the Bragg filters are adjustable by the selection of the grating parameters as well as by the use of suitable packagings.

For all the examples, both ways of pumping (in the same direction of- or in the opposite direction of the signal) can be considered. It has no impact on the invention.

The transmission system for optical signals in accordance with the invention also uses a temperature-stabilized fibre-amplifier in order to reach optimal amplification over wide temperature ranges for all transmitted wavelengths.

What is claimed:

1. An optical fibre amplifier (1) comprising at least one active component of an amplifying fibre doped with a rare-earth element (2) and at least one optical input (3) and at least one optical output (4), where the optical input and outputs are connected with a fibre-transmission section (5), characterised in that the amplifier (1) comprises at least one passive optical component (6) which comprises a material which possesses an inherent optical behavior with variation in temperature, which is opposite to the optical behavior of at least the amplifying doped fibre (2).

2. An optical fibre-amplifier in accordance with claim 1, characterised in that the optical component consists of a fibre-component (7).

3. An optical fibre-amplifier in accordance with claim 1, characterised in that the optical component comprises of a filter.

4. An optical fibre-amplifier in accordance with claim 1, characterised in that the optical component comprises of a Bragg filter.

5. An optical fibre amplifier in accordance with claim 1, characterised in that the optical component comprises of a combination of different filters with different optical behavior with temperature.

6. An optical fibre-amplifier in accordance with claim 1, characterised in that the optical component comprises of another component of fibre doped with rare-earth element.

7. A transmission system with at least one optical fibre-amplifier with at least one station and one recipient, characterised in that the fibre-amplifier is stabilized in its optical behavior at varying temperature by the use of balancing optical components.

8. Transmission system in accordance with claim 7 characterised in that it is a transmission system with wavelength division multiplexing.

9. Transmission system in accordance with claim 7 characterised in that it is a transmission system with Soliton transmission.

* * * * *